Aug. 13, 1929. C. H. RIEGEL 1,724,366

CLOSURE FOR SHEET METAL RECEPTACLES

Filed April 20, 1923

INVENTOR
C. H. RIEGEL
BY Fisher, Moser + Moore
ATTORNEYS

Patented Aug. 13, 1929.

1,724,366

UNITED STATES PATENT OFFICE.

CLARENCE H. RIEGEL, OF NILES, OHIO.

CLOSURE FOR SHEET-METAL RECEPTACLES.

Application filed April 20, 1923. Serial No. 633,451.

The present invention is an improvement in that class of sheet-metal receptacles in which an annular bushing or collar is welded to a relatively thin wall of the receptacle to provide an increased thickness of metal for the reception or attachment of a closure cap, bung, or screw-plug, and in which hermetical sealing is effected by using a gasket of rubber or other compressible material at the joint. In general, my object is to provide a bushing or collar of special design and construction which may be electrically welded to a thin sheet-metal wall without distorting the seat for the sealing gasket, and more specifically, to provide a bushing or collar having a welding flange of reduced thickness surrounding its central sealing and engaging portion which will permit a welded union to be made contiguous to, but apart from a raised seat for the sealing gasket. A further object is to provide a stepped recess within the wall and to weld a stepped annulus therein substantially flush with the plane surface of said wall interiorly of the receptacle, and to notch the relatively thicker central body portion of the annulus to promote full and complete drainage of the receptacle when the bung or plug is removed and the receptacle tilted or inverted.

Figure 1:
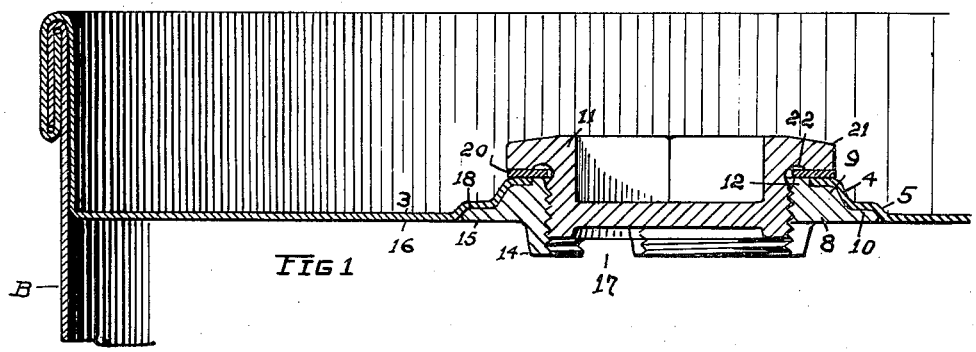
Figure 2:
Figure 5:
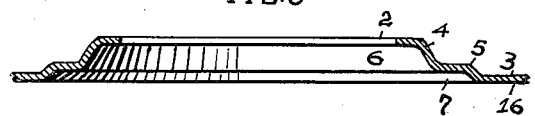
Figure 3:
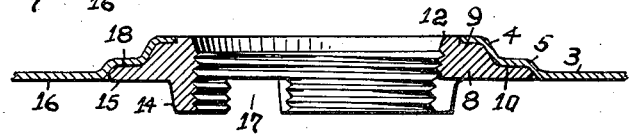
Figure 6:
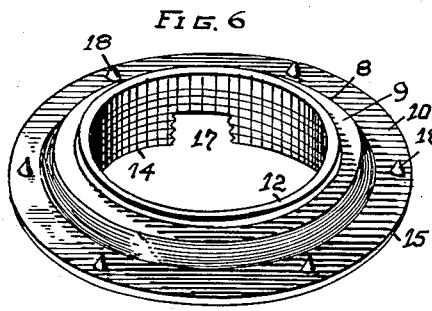
Figure 4:
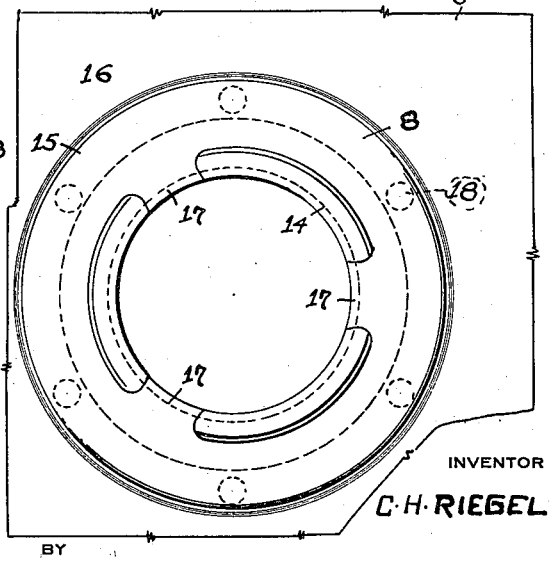

In the annexed drawing, Fig. 1 is a sectional view of a portion of the head of a sheet-metal drum cask or barrel and a screw-collar welded thereto, and with a screw-plug entered and secured within the collar. Fig. 2 is a side elevation of the bung or screw-plug, and showing a ring gasket in section thereon. Fig. 3 is a sectional view of the screw-threaded collar welded to a sheet metal wall, and without the screw-plug. Fig. 4 is a bottom view of the collar and fragment of wall shown in Fig. 3. Fig. 5 is a sectional view of a fragmentary piece of sheet-metal having an opening and stepped recess as made to receive the screw-threaded collar. Fig. 6 is a perspective view of the screw-threaded collar as it appears before it is introduced into the stepped recess and welded to the wall.

The closure device hereinafter described in detail has been expressly devised to permit its production and incorporation in a sheet metal receptacle in an economical and facile way by the use of known electrical welding methods and machines. I prefer to use electric pressure welding methods but do not wish to limit myself to such particular methods of welding as other welding steps or methods may possibly be used advantageously, following the teachings of the present disclosures. Thus, the invention involves the forming of a round opening 2 of a predetermined diameter in the sheet-metal wall 3 of a receptacle, such as a drum, cask or barrel adapted to hold and store a fluid or liquid of any kind, or in a receptacle where it is desired to have a fluid tight or hermetically sealed filling opening or dispensing outlet. As shown, the closure device is applied to the head of a cask or barrel B, but it may be incorporated instead within the side wall or body of the barrel. In either case the sheet-metal is pressed or stamped outwardly in stepped fashion to provide a raised flat round tapering boss or protuberance 4 surrounding the opening 2 and also a slightly raised annular offset 5 of larger diameter at the base of said boss or protuberance 4, thereby also producing a round and relatively deep flaring recess or cavity 6 within the boss 4 adjacent opening 2 and a second shallow recess or cavity 7 of larger diameter within the annular offset 5 remote from opening 2 and the flat top of boss 4. I also provide a wrought-iron, steel or cast metal annulus or ring-shaped re-enforcing collar 8 having stepped surfaces 9 and 10 conforming closely to the annular walls of the two recesses 6 and 7 respectively, so as to fit snugly therein when this collar is welded to the wall eventually. The central round opening within this collar is adapted to receive a screw-threaded cap, plug or bung 11, the main body of the collar being screw-threaded substantially its full depth for that purpose. The upper or outer end of the body is extended slightly above the top ledge or stepped surface 9 to provide an annular centering rib 12 adapted to enter and fit the round opening 2 in wall 3. The lower or inner end of the main body of collar 8 is reduced in diameter and extends downwardly in the form of a flange 14 beneath the flat bottom of the relatively thin laterally-extending base flange 15 which provides the first stepped surface 10. When flange 15 is seated fully within the shallow recess 7 the bottom face of the flange is substantially flush with the inner face 16 of wall 3, and therefore in order that all the liquid in the cask or barrel may be emptied or drained freely therefrom I form slots, gaps or open spaces 17 within the round depending extension or flange 14.

It should be noted in Fig. 6 that the upper surface 10 of the thin lateral flange 15 is provided with a series of pointed projections 18 at uniformly spaced intervals radially of the collar. It is at these isolated points or places that welding occurs. Thus when collar 8 is placed within the recesses 6 and 7 in wall 3 the pointed projections 18 engage the inner or bottom face of the base offset 5, and when pressure and an electric welding current is applied to these parts by means of suitable electrodes the plate 3 and the projections 18 are welded or homogeneously united together, and welding at all the points involved occurs simultaneously with the welding machines used in actual practice. Inasmuch as the heating and welding of plate 3 is localized at spaced intervals in the base offset 5 and the thin base flange 15 at points remote from the raised step 9 and the top of boss 4, no distortion or malformation of the metal occurs at such elevated places, thereby leaving a perfectly flat plane top surface for sealing gasket 20 to seat upon. A screw plug 11 having a lateral flange 21 is customarily employed with gasket 20 to effect a fluid-tight joint, and if desired the bottom face of flange 21 may be channeled, beveled or undercut at 22 opposite the centering rib 12 on collar 8 to localize the compression upon the gasket opposite the top surface 4 of wall 3. This latter feature, and the forming of a hermetical seal by compressing a gasket between a flanged cap or screw plug and the top or outer surface of the wall or body of a thin sheet metal container or receptacle re-enforced by a collar upon the inside of the container is not claimed herein as new and novel in view of the disclosures in prior Letters Patent of the United States, No. 14,439 to C. Branwhite, of 1856, for a hermetically sealing preserve can. Reference may be had also to applicant's application filed Feb. 28, 1924, which has eventuated in Letters Patent No. 1,526,375, on Feb. 17, 1925.

What I do claim, however, as new and useful in this art, is:

1. A receptacle having a sheet-metal wall formed with double stepped concentric portions surrounding a central opening, a double stepped reenforcing ring fitted within said stepped portions and welded at uniformly spaced intervals to the outer concentric portion with its face flush with the inner surface of said wall, and a closure member in coupling connection with said ring having a sealing portion overlapping the inner concentric portion.

2. A receptacle having a sheet-metal wall formed with concentric bosses and an opening, a re-enforcing ring having a lateral flange seated wholly within said bosses flush with the inner side of said wall and provided with a screw-threaded extension at its bottom having lateral drainage openings extending to the edge thereof, and a closure member connected to said ring.

In testimony whereof I affix my signature hereto.

CLARENCE H. RIEGEL.